US009242668B2

(12) United States Patent
Ennemark et al.

(10) Patent No.: US 9,242,668 B2
(45) Date of Patent: Jan. 26, 2016

(54) HYDRAULIC STEERING DEVICE

(71) Applicant: Danfoss Power Solutions APS, Nordborg (DK)

(72) Inventors: Poul Ennemark, Soenderborg (DK); Peter Gade Peistrup, Nordborg (DK); Tom Rudolph, Sydals (DK)

(73) Assignee: Danfoss Power Solutions APS, Nordborg (DK)

( * ) Notice: Subject to any disclaimer, the term of this patent is extended or adjusted under 35 U.S.C. 154(b) by 0 days.

(21) Appl. No.: 14/368,380

(22) PCT Filed: Dec. 10, 2012

(86) PCT No.: PCT/EP2012/005121
§ 371 (c)(1),
(2) Date: Jun. 24, 2014

(87) PCT Pub. No.: WO2013/097927
PCT Pub. Date: Jul. 4, 2013

(65) Prior Publication Data
US 2015/0158523 A1 Jun. 11, 2015

(30) Foreign Application Priority Data

Dec. 28, 2011 (EP) .................................. 11010247

(51) Int. Cl.
*B62D 5/093* (2006.01)
*B62D 5/32* (2006.01)
*B62D 5/065* (2006.01)

(52) U.S. Cl.
CPC ................ *B62D 5/093* (2013.01); *B62D 5/065* (2013.01); *B62D 5/32* (2013.01)

(58) Field of Classification Search
CPC ........... B62D 5/093; B62D 5/32; B62D 5/065
See application file for complete search history.

(56) References Cited

U.S. PATENT DOCUMENTS 5,620,026 A 4/1997 Stephenson et al.
5,819,532 A 10/1998 Wang et al.
(Continued)

FOREIGN PATENT DOCUMENTS

CN 1034512 A 8/1989
CN 1201924 A 12/1998
(Continued)

OTHER PUBLICATIONS

International Search Report for PCT Serial No. PCT/EP2012/005121 dated Feb. 18, 2013.
(Continued)

*Primary Examiner* — Kevin Hurley
(74) *Attorney, Agent, or Firm* — McCormick, Paulding & Huber LLP

(57) ABSTRACT

A hydraulic steering device (1) is described comprising a supply port arrangement having a supply port (P) and a tank port (T), a working port arrangement having two working ports (L, R), a main flow path (14) between the supply port (P) and the working port arrangement, a return flow path (16) between the working port arrangement and the tank port (T), flow meter means (15) being arranged in said main flow path (14), said flow meter means (15) comprising at least two flow meters (27, 28) and a flow meter valve means (30), said flow meter valve means (30) in a first operation mode connecting at least two flow meters (27, 28) in parallel and in a second operation mode making inactive at least one flow meter (27). Such a steering device should be operated comfortable for a driver. To this end an amplification flow path (17) is arranged in parallel to said main flow path (14), said amplification flow path (17) being connected to said main flow path (14) downstream said flow meter means (15) in a direction from said supply port (P) to said working port arrangement.

20 Claims, 3 Drawing Sheets

(56) References Cited

U.S. PATENT DOCUMENTS

| | | | |
|---|---|---|---|
| 2008/0116001 A1 | 5/2008 | Graeve et al. | |
| 2009/0199915 A1 | 8/2009 | Novacek et al. | |
| 2014/0298792 A1* | 10/2014 | Andersen et al. | 60/433 |
| 2014/0374187 A1* | 12/2014 | Arbjerg et al. | 180/441 |
| 2015/0158522 A1* | 6/2015 | Thayer | 180/441 |

FOREIGN PATENT DOCUMENTS

| | | |
|---|---|---|
| CN | 1206382 A | 1/1999 |
| CN | 1323709 A | 11/2001 |
| CN | 201297306 Y | 8/2009 |
| CN | 201484482 U | 5/2010 |
| CN | 101952159 A | 1/2011 |
| DE | 2228531 C2 | 7/1982 |
| DE | 195 11 501 A1 | 10/1996 |
| DE | 10257130 A1 | 7/2004 |
| DE | 10252215 B3 | 10/2004 |
| DE | 102005035171 A1 | 2/2007 |
| EP | 0096963 A2 | 12/1983 |
| EP | 1 212 231 B1 | 6/2002 |

OTHER PUBLICATIONS

International Search Report for PCT Application No. PCT/EP2012/005119 dated Feb. 26, 2013.

International Search Report for PCT Application No. PCT/EP2012005120 dated May 8, 2013.

European Search Report for European Application No. EP11010247 dated Jul. 9, 2012.

European Search Report for European Application No. EP11010248 dated Jul. 9, 2012.

European Search Report for European Application No. EP11010236 dated Jul. 9, 2012.

* cited by examiner

HYDRAULIC STEERING DEVICE

CROSS REFERENCE TO RELATED APPLICATIONS

This application is entitled to the benefit of and incorporates by reference subject matter disclosed in International Patent Application No. PCT/EP2012/005121 filed on Dec. 10, 2012 and European Patent Application 11010247.2 filed Dec. 28, 2011.

FIELD OF THE INVENTION

The present invention relates to a hydraulic steering device comprising a supply port arrangement having a supply port and a tank port, a working port arrangement having two working ports, a main flow path between the supply port and the working port arrangement, a return flow path between the working port arrangement and the tank port, flow meter means being arranged in said main flow path, said flow meter means comprising at least two flow meters and flow meter valve means, said flow meter valve means in a first operation mode connecting at least two flow meters in parallel and in a second operation mode making inactive at least one flow meter.

BACKGROUND

Such a hydraulic steering device is known from DE 195 11 501 A1. When a vehicle equipped with such a hydraulic steering device is driven in a so called "normal mode" the two fluid meters are arranged in parallel. In this case steering of the vehicle can be effected by rotating the steering wheel over a small angle. In a so called "emergency steering mode" there is no supply of hydraulic fluid under pressure. In this case one of the fluid meters is operated as auxiliary pump. Steering of the wheels of the vehicle requires a larger rotation of the steering wheel, however, with a reduced torque. Automatic switching between the two modes can be realized by means of the pressure at the supply port and by means of a spring acting in the opposite direction.

Another steering device of the kind mentioned above is known from US 2009/0199915 A1. In this steering device the flow meter valve means is arranged between the two fluid meters.

A further steering device is known from EP 1 212 231 B1 in which the fluid meter valve means is arranged in a housing surrounding a cardan shaft connecting the two fluid meters.

However, when such a steering device is used in a vehicle requiring a large volume flow for operating a steering motor the driving is rather uncomfortable for the driver. The driver has to perform many rotations with the steering wheel (or any other steering actuator) in order to turn the steered wheels as desired.

SUMMARY

An object underlying the invention is to make steering comfortable for a driver.

This object is solved in that an amplification flow path is arranged in parallel to said main flow path, said amplification flow path being connected to said main flow path downstream said flow meter in a direction from said pressure port to said working port arrangement.

The amplification flow path allows a flow of hydraulic fluid from the pressure port to the working port arrangement bypassing the flow meter means. The amplification flow path is controlled by valving means similar to those controlling the main flow path. In most cases such a steering device comprises a spool and a sleeve. The rotation of spool and sleeve relative to each other closes some orifices and opens some other orifices. In this case it is only necessary to provide for additional orifices being arranged in the amplification flow path so that a flow through the amplification flow path is possible only when there is a flow through the main flow path.

Preferably said flow meter valve means is connected to a flow meter valve controller, said flow meter valve controller controlling the operation mode of said flow meter valve means. In this case the switching between two operating modes can be performed not only when the pressure at the pressure port decreases, but the driver can chose one of two possibilities. When the flow meter valve means is operated in the first operation mode the turning of a steering wheel causes a relatively large flow of hydraulic fluid to be supplied to the steering motor connected to the working port arrangement. When the flow meter means is operated in the second operation mode the same turning angle of the steering wheel causes a smaller amount of hydraulic fluid to be supplied to the working port arrangement. Therefore, the driver can chose the operation mode which is most comfortable for him.

Preferably said flow meter valve means comprises a solenoid valve. A solenoid valve can be actuated remotely, e.g. from the driver's cabin.

Preferably amplification valve means is arranged in said amplification flow path, said amplification valve means in a first operation mode allowing fluid to pass through said amplification flow path and in a second operation mode interrupting said amplification flow path. The amplification valve means give a further possibility to change the steering behaviour. When the amplification valve means is operated in the first operation mode the volume flow through the steering device is amplified. In this case a small turning angle of the steering wheel causes a rather large turning angle of the steered wheels. When the amplification flow path is interrupted by the amplification valve means a larger turning angle of the steering wheel is necessary to turn the steered wheels by the same angle as before.

In a preferred embodiment an amplification factor of the amplification flow path differs from a ratio of displacement of the at least two flow meters. In this case it is possible to have four different relations between the turning angle of the steering wheel and the turning angle of the steered wheel. The steering device can be operated with two flow meters and the amplification flow path. This is the first possibility. The steering device can furthermore be operated with one flow meter and the amplification flow path. This is the second possibility. A third possibility is to operate the steering device with two flow meters but without an amplification flow path and the fourth possibility is to operate this steering device with one flow meter and without the amplification flow path.

Preferably said amplification valve means is connected to an amplification valve controller, said amplification valve controller controlling the operation mode of said amplification valve means. In this case the controller can switch the amplification valve means between the operating modes.

In this case it is of advantage that said amplification valve means comprises a solenoid valve. A solenoid valve can be operated remotely, i.e. by the amplification valve controller.

Preferably said flow meter valve controller and/or said amplification valve controller are actuatable by a driver of a vehicle equipped with said steering device. In this case it is only necessary to provide for a switch or the like in the driver's cabin. The driver has the free choice to chose one of the steering modes illustrated above. It is possible to use two switches, one for the flow meter valve means and one for the amplification valve means. However, it is also possible to use one switch having four switching positions so that the four modes of operations of the steering device can be selected by one switch.

Additionally or alternatively said flow meter valve controller and/or said amplification valve controller are actuatable depending on operation parameters of a vehicle equipped with said steering device. Said operation parameters can be speed, load, use of a trailer, use of working equipments in agricultural machines etc. The selection of the respective mode of operation can be performed automatically. However, in some cases it is desirable to override such a selection by the driver.

Additionally or alternatively it can be advantageous that said flow meter valve controller and/or said amplification valve controller are actuatable depending on parameters of an environment of the vehicle equipped with said steering device. Such parameters can be humidity (rain), light (night or day), condition of the underground (street or mud) etc. In this case too, it is preferred, that the automatic selection according to the environmental parameters can be overridden by the driver.

In a preferred embodiment said flow meter valve means and/or said amplification valve means are pressure responsive and are operated in said second mode in case a pressure at the supply port decreases below a predetermined threshold value. Such an emergency situation overrides the selection made by the driver, by vehicle parameters or by environmental parameters. The flow meter means is switched to operate with one flow meter only and the amplification path is interrupted, both allowing an emergency steering mode.

Preferably a variable main orifice is arranged in said main flow path, said variable main orifice being closed in a neutral position and open in a steering mode, a variable auxiliary orifice being arranged in said amplification flow path, said variable amplification orifice being closed in said neutral position and open in said steering mode. Such a construction allows in a simple manner the volume flow of hydraulic fluid through the amplification path only in situations in which a corresponding volume flow takes place through the main flow path.

Preferably a ratio of the opening degrees of said variable main orifice and said variable amplification orifice varies over a steering angle or steering speed, respectively. In this case, it is possible to "play" with the two bleed characteristics of the variable main orifice and the variable amplification orifice. For example, in a steering speed of 0-20 rotations per minute (rpm) there is no amplification by the amplification flow path and the flow starts increasing at 30 rpm only. Other steering speeds or steering angles are possible.

Furthermore, it is preferred that the ratio of the opening degrees of said variable main orifice and said variable amplification orifice is asymmetric with respect to the steering direction. In this case it is possible to realize different left/right amplification, i.e. one amplification factor is assigned to the right side and another amplification factor is assigned to the left side. This could be an advantage for example in the case of an unbalanced cylinder.

In a further preferred embodiment, said main orifice is arranged downstream said flow meter means. A main orifice is the orifice having the largest throttle resistance. When the hydraulic steering device is operated in emergency mode, the flow meter means is used as auxiliary pump as mentioned above. When the main orifice (which is commonly referred to as A1 orifice) is arranged downstream the flow meter means, the flow meter means pumps hydraulic fluid through the main orifice. When the main orifice is arranged upstream the flow meter means, the flow meter means sucks hydraulic fluid through the main orifice in this case, there is a danger of cavitation within the fluid meter.

BRIEF DESCRIPTION OF THE DRAWINGS

Preferred examples of the invention will now be described in more detail with reference to the drawings, wherein.

DETAILED DESCRIPTION

Figure 1:
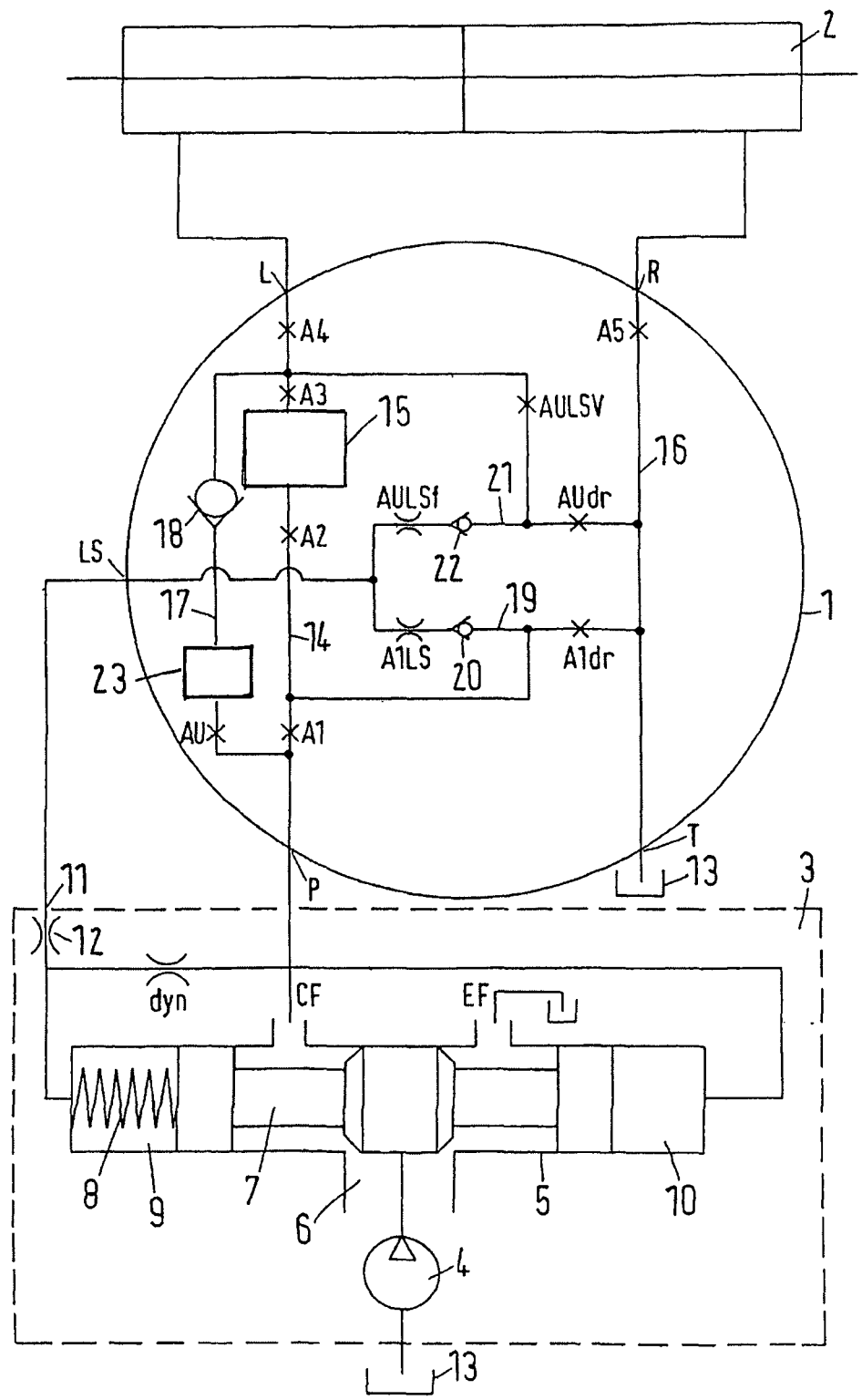
FIG. 1 is a schematic view of a hydraulic circuit of a hydraulic steering device.

A hydraulic circuit 1 of a steering control unit comprises a supply port arrangement having a supply port P and a return port T. Furthermore, the circuit 1 comprises a working port arrangement having two working ports L, R. The working ports L, R can be connected to a steering motor 2 shown by way of example. Other types of steering motors are possible.

The supply port P is connected with a source 3 of hydraulic fluid under pressure. In the present case this source comprises a fixed displacement pump 4 and a priority valve 5, the input 6 of which being connected to the pump 4. The priority valve 5 has a first output CF connected to the supply port P of the steering control unit 1 and a second output EF connected to a further hydraulic consumer having a lower priority than the steering control unit 1 as it is known in the art.

The priority valve is of a dynamic load sensing type as it is known in the art. The priority valve 5 comprises a piston 7 controlling the flow of hydraulic fluid from the input 6 to one of the two outputs CF, EF. The piston 7 is on one side loaded by a spring 8. The spring 8 is arranged in a first pressure chamber 9. This pressure chamber 9 is connected to the first output CF of the priority valve via a bleed dyn.

However, a priority valve is not in at least two cases necessary.

The opposite side of the piston 7 is loaded by a pressure in a second pressure chamber 10. The second pressure chamber 10 is connected to the first output CF of the priority valve 5. The source 3 has a load sensing input which is connected to the first pressure chamber 9 via a fixed bleed 12.

Such source 3 of dynamic load sensing type is known per se so that no further explanation is necessary. However, the source 3 can be replaced by another source of a dynamic load sensing type, like a load sensing controlled pump.

The supply port P of the steering control unit 1 is connected to the first output CF of the priority valve 5. The return port T is connected to a tank 13. The load sensing port LS is connected to the load sensing port 11 of the source 3.

FIG. 1 schematically shows a main flow path 14. The main flow path 14 comprises in series connection a variable main flow orifice A1, a first variable flow meter orifice A2, flow meter means 15, a second variable flow meter orifice A3 and a variable working port orifice A4. The flow meter means 15 is described in connection with FIG. 3.

The steering device usually comprises a housing, a spool and a sleeve which together do not only define the variable orifices A1-A4 but include also direction valve means which are not shown here in order to simplify the explanation. Therefore the main flow path 14 is arranged between the supply port P and one of the working ports L depending on the direction of rotation of the steering wheel. The main flow path 14 can be established between the supply port P and the other working port R as well.

When the main flow path 14 has been established between the supply port P and the left working port L, a return flow path 16 is established between the right working port R and the return port T. A variable working port orifice A5 is arranged in this return flow path 16.

An amplification flow path 17 is arranged parallel to the main flow path 14. The amplification flow path 17 branches of the main flow path 14 upstream the variable main orifice A1 and is connected to the main flow path 14 downstream the second variable flow meter orifice A3. A check valve 18 is arranged in the amplification flow path 17 opening in a direction to the working port L.

The load sensing port LS is connected to the main flow path 14 by means of a main load sensing path 19. A first fixed orifice A1LS is arranged in said main load sensing path 19 as well as a check valve 20 opening in a direction to the main flow path 14. Furthermore the main load sensing path 19 is connected to the return port T via first drain orifice means A1dr.

Furthermore the load sensing port LS is connected to the amplification flow path 17 by means of a second load sensing path 21. A second fixed orifice AULSf is arranged in this second load sensing path 21 as well as a check valve 22 opening in a direction to the amplification flow path 17. The second load sensing path 21 is connected to the return port T via second drain orifice means AUdr.

Steering preventing means AULSV are arranged in the second load sensing path 21 between the check valve 22 and the amplification flow path 17.

The operation of the steering control unit 1 is as follows:

In a neutral position (steering angle equal 0±a deadband) the orifices A1, A2, A3, A4, A5 and AULSV are closed. The first drain orifice A1dr and a second drain orifice AUdr are open to allow hydraulic fluid supplied via the load sensing port LS to be drained to the return port T. Therefore some hydraulic fluid under pressure necessary for actuating the steering motor 2 is permanently available in the steering control unit 1 as it is in an open centre steering control unit. This has the additional advantage that the steering control unit 1 can be permanently held on the temperature of the hydraulic fluid.

When a driver of a vehicle in which the steering control unit 1 is build in operates the steering wheel, the valving elements of the steering control unit 1 are moved relative to each other, e.g. the spool and the sleeve are rotated relative to each other. Depending on the angle of rotation the variable orifices behave as follows: The first orifices to open are the variable flow meter orifices A2, A3. The next orifices to open are the working port orifices A4, A5. The last orifices to open are the variable main orifice A1 and the variable amplification orifice AU. The steering preventing means AULSV which is presently also a variable orifice starts to open between the variable flow meter orifices A2, A3 and the variable working port orifices A4, A5.

The first drain orifice means A1dr and the second drain orifice means AUdr start closing when the spool and the sleeve are rotated relative to each other. However, they are fully closed only at an angle at which the variable main orifice A1 and the variable amplification orifice AU just have started to open.

When the steering angle is large, the two drain orifice means A1dr, AUdr are closed so that hydraulic fluid can not escape from the load sensing port LS directly to the return port T. Hydraulic fluid is supplied from the supply port P to one of the working ports L through the main flow path 14 and through the amplification flow path 17. The fluid in the main flow path 14 is metered. The metering in the flow meter means 15 provoke that the spool and the sleeve are returned back to their neutral position. When the variable main orifice A1 closes, the variable amplification orifice AU closes as well. Therefore the flow of fluid through the amplification flow path 17 is controlled in the same way as the flow of fluid through the main flow path 14.

The volume flow is determined by the flow resistance of the amplification flow path 17. When this flow resistance is the same as that of the main flow path 14, the same flow is established through the main flow path 14 and through the amplification flow path 17 so that an amplification of 2:1 can be achieved. When the flow resistance of the amplification flow path 17 is only half of the flow resistance of the main flow path 14, the flow of hydraulic fluid through the amplification flow path 17 will be double of that through the main flow path 14 so that an amplification of 3:1 can be achieved.

In a preferred embodiment the ratio of the opening degrees of the variable main orifice A1 and the variable amplification orifice AU varies over a steering angle or a steering speed, respectively. In this case the amplification can be made variable. It is possible to have no amplification in a certain range around the neutral position, for example from 0 to 20 rotations per minute (rpm). Amplification starts only from 30 rpm on. Other values are possible. This can be done by "playing" with the two bleed characteristics of the variable main orifice A1 and the variable amplification orifice AU.

Furthermore, the ratio of the opening degrees of the variable main orifice A1 and the variable amplification orifice AU can be made asymmetric so that an asymmetric amplification could be imagined. In this case there are different amplification factors for the left side and the right side. This is an advantage for example in the case of an unbalanced cylinder.

When the steering angle is small, the variable main orifice A1 and the variable amplification orifice AU are not opened. Nevertheless the steering motor 2 should be actuated. To this end the first drain orifice means A1dr and the second drain orifice means AUdr are throttled. The ratio between the first drain orifice means A1dr and the second drain orifice means AUdr is the same as the ratio between the flow resistance between the main flow path 14 and the amplification flow path 17, i.e. when the volume flow through the main flow path 14 is the same as through the amplification flow path 17, the volume flow through the main load sensing path 19 is the same as through the amplification load sensing path 21. When the amplification flow path 17 allows the double of the flow through the main flow path 14 the amplification load sensing path 21 allows the double of the flow through the main load sensing path 19.

The two drain orifice means A1dr, AUdr have the same throttling characteristic, i.e. at each angle of rotation between spool and sleeve the first drain orifice means A1dr allows the same percentage of the flow through the main load sensing path 19 to part as the second drain orifice means AUdr does.

As mentioned above, when the steering angle is only small, the variable main orifice A1 and the variable amplification orifice AU are still closed. However, the two drain orifice means A1dr, AUdr start throttling the flow of hydraulic fluid to the return port T so that the remaining flow of hydraulic fluid enters the main flow path 14 and the amplification flow path 17, respectively, to arrive at the working port L in order to actuate the steering motor 2. Hydraulic fluid coming back from the steering motor 2 enters the steering control unit 1 at the other working port R and returns back to the tank 13 via the tank port T.

There are only two ways for the hydraulic fluid entering the steering control unit 1 at the load sensing port LS: The first way is via the main load sensing path 19 and the first drain orifice means A1dr and the amplification load sensing path 21 and the second drain orifice means AUdr directly to the tank port T. The other way is (when the two drain orifice means A1dr, AUdr are partly or fully closed) through the main flow path 14 or the second flow path 17, respectively, to the working port L and back through the working port R. It is advantageous to match the variable working port orifice A5 to the two drain orifice means A1dr, AUdr so that the variable working port orifice A5 can take over the volume flow of hydraulic fluid which is throttled by the two drain orifice means A1dr, AUdr. However, the variable working port orifice A5 is dimensioned so that a certain back pressure can be achieved in the steering motor 2.

Figure 3:
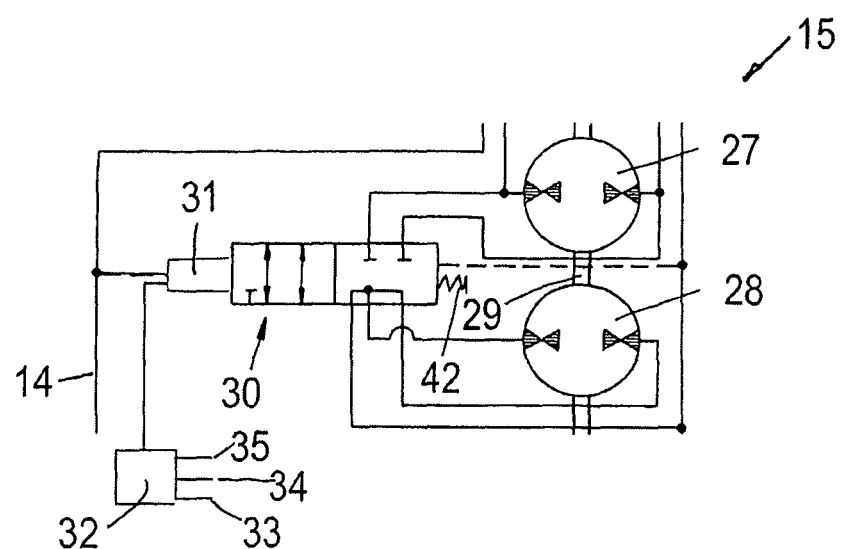
FIG. 3 is a schematic view showing flow meter valve means and FIG. 4 is a schematic view showing amplification valve means.

FIG. 3 shows in an enlarged view the flow meter means 15 used in the hydraulic circuit of FIG. 1. This flow meter means 15 comprises a first flow meter 27 and a second flow meter 28. Both flow meters 27, 28 are connected by a common shaft 29 which is connected to the sleeve of the direction valve as it is known in the art. The two flow meters 27, 28 have different displacements. The displacement of the flow meter 27 is smaller than the displacement of the flow meter 28. A flow meter valve means 30 is provided. In a first operation mode the flow meter valve means 30 connects the flow meters 27, 28 in parallel. In a second operation mode the flow meter valve means 30 makes inactive the flow meter 28 so that only the flow meter 27 is used.

In a way known in the art the flow meter 27 or the two flow meters 27, 28 receive a flow of hydraulic fluid from the steering unit and pass this flow to one of the working ports L, R. In the second operation mode shown in FIG. 3 the flow meter 27 can also be used as an auxiliary pump in an emergency steering mode.

The flow meter valve means 30 is basically made as a solenoid valve having a solenoid 31 as drive acting against the force of a return spring 42. This solenoid 31 is controlled by a controller 32. However, the flow meter valve means 30 needs the pressure in the main flow path 14 on the side of the supply port P to be actuated. When this pressure decreases under a predetermined threshold value the flow meter valve means 30 is automatically switched into the second mode shown in FIG. 3.

It is possible to use more than the two flow meters 27, 28 shown. In this case in the first operation mode at least two flow meters are connected in parallel and in the second operation mode at least one flow meter is made inactive. However, the displacement of the active flow meters in the first operation mode is preferably larger than the displacement of the active flow meters in the second operation mode.

The flow meter controller 32 has three inputs 33, 34, 35. The first input 33 can be connected to a switch or any other commanding element arranged in the driver's cabin so that the driver can voluntarily switch the flow meter valve means 30 between the two operating modes.

A second input 34 is connected to a sensor arrangement detecting at least one parameter of the vehicle equipped with the steering device. Examples for such parameters are speed, loading, use of a trailer or of additional devices like in an agricultural vehicle. When for example the speed is high it could be advisable to inactivate the second flow meter 28.

A third input 35 is connected to a sensor arrangement detecting environmental parameters, for example humidity (rain), light (night or day), condition of the underground (street or mud) or the like. The steering device can then automatically chose the appropriate steering behaviour, i.e. whether the first operation mode or the second operation mode of the flow meter means 15 is used.

In any case the driver can override the signalling in the inputs 34, 35.

Figure 4:
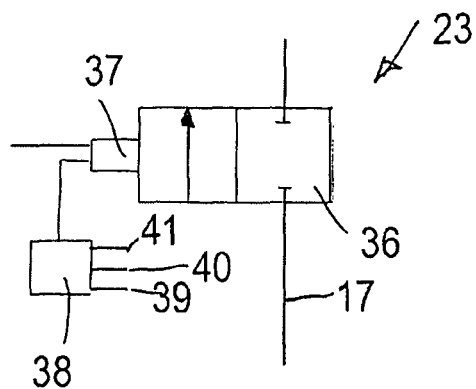

The amplification flow path 17 comprises amplification valve means 23 which is schematically shown in FIG. 4. The amplification valve means 23 comprises in a simple form an on-off-valve 36 which is also a solenoid valve driven by a solenoid 37. The operation of the solenoid 37 is controlled by an amplification valve controller 38 which can be similar to the flow meter valve controller 32. The amplification valve controller 38 comprises three inputs 39, 40, 41 having the same characteristics as the inputs 33-35 of the flow meter controller 32.

The amplification factor of the amplification flow path 17 relative to the main flow path 14 differs from the ratio of the displacements of the two flow meters 27, 28.

The driver controlling the two controllers 32, 38 via the inputs 33, 39 therefore has four possibilities to adjust the steering behaviour of the steering device.

In a first possibility there is "full amplification", i.e. he uses the flow meter valve means 30 and the amplification valve means 23 in the first operation mode in which the two flow meters 27, 28 are working and the amplification flow path 17 is open to amplify the volume flow.

In a second possibility the operator uses the flow meter means 15 in the second operation mode inactivating the second flow meter 28.

In a third possibility the steering device is driven with the two flow meters 27, 28, but without the amplification flow path 17.

In a fourth possibility the steering device is used with one flow meter 27 only and without an amplification by the amplification flow path 17.

The hydraulic steering device according to FIG. 1 works according to the dynamic principle.

Figure 2:
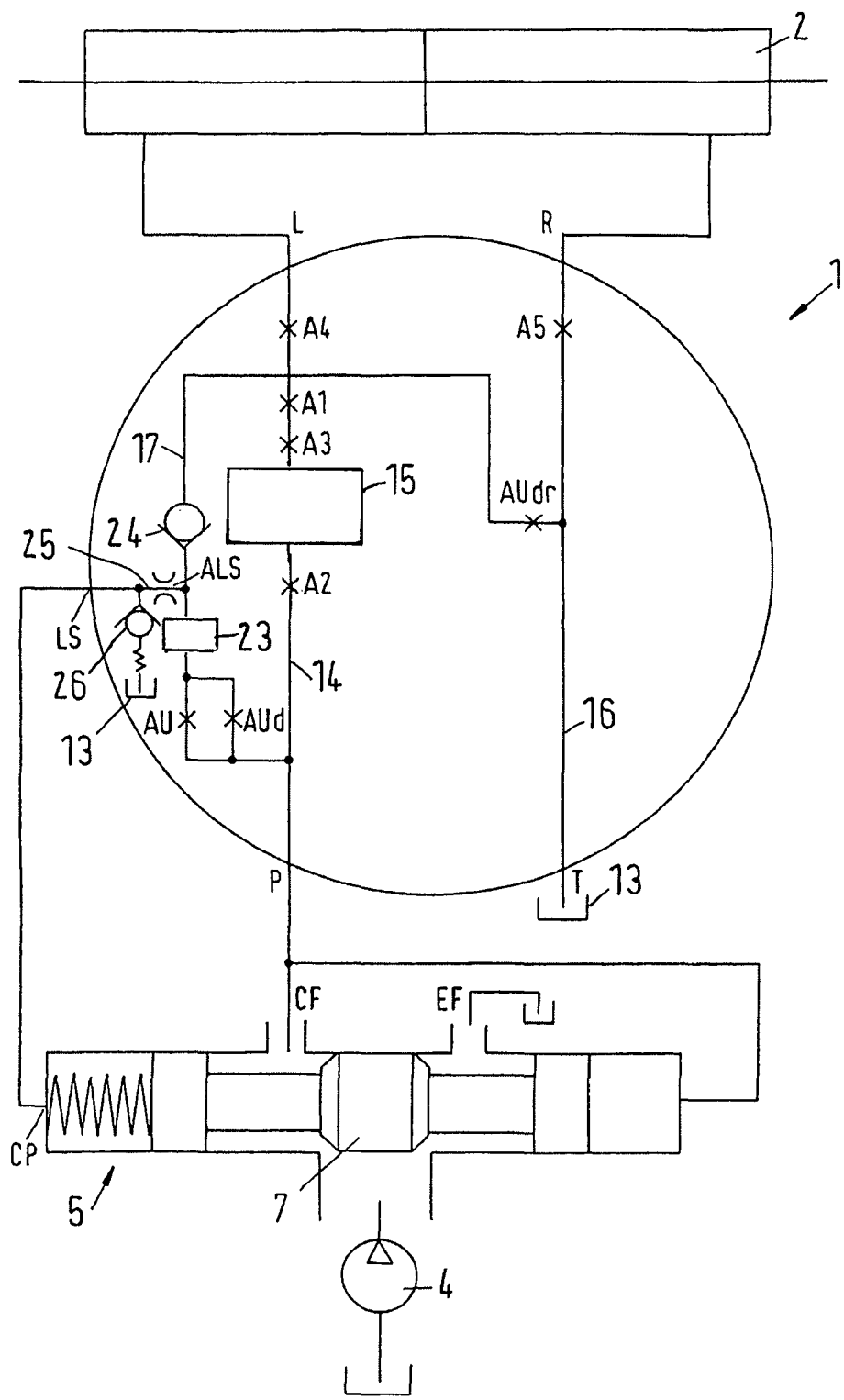
FIG. 2 is a schematic view of a hydraulic circuit of another embodiment of a hydraulic steering device.

FIG. 2 shows another embodiment of a hydraulic steering device working according to the static principle. Elements corresponding to those of FIG. 1 are designated with the same reference numerals.

FIG. 2 schematically shows a steering device 1 working according to the static principle. The steering device 1 comprises a supply port P and a tank port T. The supply port P and the tank port T together form a supply port arrangement. Furthermore, the hydraulic steering device 1 comprises two working ports L, R, said two working ports L, R forming a working port arrangement. A steering motor 2 can be connected to the working port arrangement L, R.

A static priority valve 5 is arranged between a pump 4 and the supply port P of the hydraulic steering device. The priority valve 5 comprises a priority output CF and an auxiliary output EF. The priority valve 5 comprises a valve element 7 which is slidingly arranged in a bore of a housing as it is known in the art.

However, such a priority valve is not necessary in at least two cases.

The hydraulic steering device 1 comprises a main flow path 14. Fluid meter means 15 are arranged in the main flow path 14. A first variable fluid meter orifice A2 is arranged upstream the fluid meter means 15 and a second fluid meter orifice A3 is arranged downstream the fluid meter means 15. Furthermore, a variable main orifice A1 is arranged downstream the fluid meter means 15.

The fluid meter means 15 are the same as those used in connection with FIG. 1. They are shown in FIG. 3.

The orifices A1, A2, A3 can be formed by an arrangement of a spool and a sleeve which are arranged rotatably with respect to each other. Furthermore, the sleeve is arranged rotatably within a housing. The orifices A1, A2, A3 are formed between the spool and the sleeve. As it is known in the art, when an operator turns a steering wheel, the sleeve and the spool are rotated relatively to each other opening the three orifices A1, A2, A3. The fluid flowing through these orifices actuates the fluid meter means 15 which rotates the other one of sleeve and spool (which has not been actuated by the steering wheel) back to the neutral position so that it can be made sure that a metered amount of hydraulic fluid can be outputted through one of the working ports L, R. The "neutral position" always includes a certain dead band.

Two working port orifices A4, A5 can as well be formed by the combination of the spool and the sleeve. It depends on the direction of the rotation of spool and sleeve relative to each other which of the two working port orifices A4, A5 is placed in the main flow path 14 and which is placed in a return flow path 16. The return flow path 16 connects the other of the two working ports R, L to the tank port T.

Since such a construction is known in the art, no further explanation is deemed to be necessary.

In an emergency case the pressure at the supply port P is not sufficient to actuate the steering motor 2. In this case, the fluid meter means 15 are used as auxiliary pump. When the steering wheel is turned, the fluid meter means 15 are operated sucking hydraulic fluid from the supply port P and pumping it through the main orifice A1 to one of the working ports L, R. Since the variable main orifice A1 is arranged downstream the fluid meter means 15, cavitation in the fluid meter means 15 can be avoided or dramatically reduced since there is no suction resistance between the supply port P and the input of the fluid meter means 15.

An amplification flow path 17 is arranged in parallel to the main flow path 14. The amplification flow path 17 is connected to the supply port P and is connected to the main flow path 14 downstream the variable main orifice A1, i.e. to a point between the variable main orifice A1 and one of the working port orifices A4, A5.

A variable amplification orifice AU is arranged in the amplification flow path 17. An auxiliary orifice AUd is arranged in parallel to a variable amplification orifice AU. This auxiliary orifice AUd is preferably a variable orifice.

A check valve 24 is arranged downstream the variable amplification orifice AU.

A load sensing line 25 branches off from the amplification flow path 17 between the variable amplification orifice AU and the check valve 24. The load sensing line 25 connects the amplification flow path 17 and a load sensing port LS which is connected to a control port CP of the priority valve 5.

A fixed bleed ALS is arranged in the load sensing line 25.

Furthermore, an overpressure valve 26 branches off the load sensing line 25. The overpressure valve 26 opens at a predetermined pressure in the main flow path 17 and allows hydraulic fluid to escape to a tank 13, thereby decreasing the amplification ratio of the amplification flow path.

A variable drain orifice AUdr connects the main flow path 14 downstream the variable main orifice A1 and the return flow path 16.

The orifices A1, A2, A3, A4, A5, AU, AUd, and AUdr have different characteristics.

The variable auxiliary orifice AUd and the variable drain orifice AUdr are open in a neutral position and are closed in a steering mode. In the present example the neutral position is defined with a steering angle in a range from 0° to 3°. A steering angle is for example the relative rotation between the spool and the sleeve mentioned above.

The opening area of the variable drain orifice AUdr is always larger than the opening area of the variable auxiliary orifice AUd. Therefore, at least two hydraulic fluids passing through the variable auxiliary orifice AUd can pass also through the variable drain orifice AUdr. In other words, there is no accumulation of hydraulic fluid upstream the variable drain orifice AUdr. An unwanted pressure increase at one of the working ports L, R can be avoided reliably.

At a steering angle of approximately 4° the variable main orifice A1 and the variable amplification orifice AU start to open. In one embodiment of the ratio of the opening areas of these two orifices is kept constant over the range of steering angles. The opening area of the variable amplification orifice AU is twice of the opening area of the variable main orifice A1. Therefore, a fluid flow is generated through the amplification flow path 17 which is the double of the flow through the main flow path 14. As a result AU+A1 a volume flow is generated being three times the volume flow of the main flow path 14.

In another embodiment, the two bleeds, i.e. the variable amplification orifice AU and the variable main orifice A1 do not have a constant ratio over the steering angle or the steering speed. However, the ratio varies in order to make the amplification variable. For example, from 0-20 RPM (rotations per minute) there is no amplification and the flow starts increasing at 30 RPM. The exact threshold values (20 RPM and 30 RPM) depend on the field of the application of the hydraulic steering device.

Also an asymmetric amplification could be imagined, so that different left/right amplifications appear (one amplification to the right and another one to the left). This could be an advantage for example in the case of an unbalanced cylinder.

Since in the steering mode (starting at a steering angle of 4°) the variable auxiliary orifice AUd and the variable drain orifice AUdr are closed, there is no flow of hydraulic fluid through these two orifices.

However, since in the neutral position (between 0° and 3°) the variable main orifice A1 and the variable amplification orifice AU are closed and the variable auxiliary orifice AUd and the variable drain orifice AUdr are open, any fluid coming from the supply port P can pass through the steering device 1 without generating an increased pressure within the steering device 1. Therefore, any leakage coming from the priority valve 5 can be accepted.

In the emergency steering mode the fluid meter 9 is used as auxiliary pump as mentioned above. The check valve 24 blocks any reverse flow through the amplification flow path 17, so that at least two fluids pumped by the fluid meter means 15 reaches one of the working ports L, R. When the fluid meter means 15 is operated by a steering wheel, the steering angle is large enough to close the variable drain orifice AUdr.

In the amplification flow path 17 comprises as well amplification valve means 23 which is shown in FIG. 4. Therefore, even with the steering device 1 shown in FIG. 2 the formals of operation are possible.

The steering device can be used in a reaction or in a non-reaction steering system. In a reaction steering system the driver can feel at the steering wheel a force acting on the steered wheels. In a non-reaction steering system the driver cannot feel at the steering wheel forces acting on the steered wheels.

Although various embodiments of the present invention have been described and shown, the invention is not restricted thereto, but may also be embodied in other ways within the scope of the subject-matter defined in the following claims.

What is claimed is:

1. A hydraulic steering device comprising
a supply port arrangement having a supply port (P) and a tank port (T), a working port arrangement having two working ports (L, R), a main flow path between the supply port (P) and the working port arrangement, a return flow path between the working port arrangement and the tank port (T),
flow meter means being arranged in said main flow path, said flow meter means comprising at least two flow meters and flow meter valve means, said flow meter valve means in a first operation mode connecting at least two flow meters in parallel and in a second operation mode making inactive at least one flow meter, wherein an amplification flow path is arranged in parallel to said main flow path, said amplification flow path being connected to said main flow path downstream said flow meter means in a direction from said supply port (P) to said working port arrangement.

2. The hydraulic steering device according to claim 1, wherein said flow meter valve means is connected to a flow meter valve controller, said flow meter valve controller controlling the operation mode of said flow meter valve means.

3. The hydraulic steering device according to claim 1, wherein said flow meter valve means comprises a solenoid valve.

4. The hydraulic steering device according to claim 1, wherein amplification valve means is arranged in said amplification flow path, said amplification valve means in a first operation mode allowing fluid to pass through said amplification flow path and in a second operation mode interrupting said amplification flow path.

5. The hydraulic steering device according to claim 4, wherein an amplification factor of the amplification flow path differs from a ratio of displacement of the at least two flow meters.

6. The hydraulic steering device according to claim 4, wherein said amplification valve means is connected to an amplification valve controller said amplification valve controller controlling the operation mode of said amplification valve means.

7. The hydraulic steering device according to claim 6, wherein said amplification valve means comprises a solenoid valve.

8. The hydraulic steering device according to claim 6, wherein said flow meter valve controller and/or said amplification valve controller are actuatable by a driver of a vehicle equipped with said steering device.

9. The hydraulic steering device according to claim 6, wherein said flow meter valve controller and/or said amplification valve controller are actuatable depending on operation parameters of a vehicle equipped with said steering device.

10. The hydraulic steering device according to claim 6, wherein said flow meter valve controller and/or said amplification valve controller are actuatable depending on parameters of an environment of the vehicle equipped with said steering device.

11. The hydraulic steering device according to claim 4, wherein said flow meter valve means and/or said amplification valve means are pressure responsive and are operated in said second mode in case a pressure at said supply port (P) decreases below a predetermined threshold value.

12. The hydraulic steering device according to claim 1, wherein a variable main orifice is arranged in said main flow path, said variable main orifice being closed in a neutral position and open in a steering mode, a variable auxiliary orifice being arranged in said amplification flow path, said variable amplification orifice being closed in said neutral position and open in said steering mode.

13. The hydraulic steering device according to claim 12, wherein a ratio of the opening degrees of said variable main orifice and said variable amplification orifice varies over a steering angle or steering speed, respectively.

14. The hydraulic steering device according to claim 12, wherein the ratio of the opening degrees of said variable main orifice and said variable amplification orifice is asymmetric with respect to the steering direction.

15. The hydraulic steering device according to claim 12, wherein said main orifice is arranged downstream said flow meter means.

16. The hydraulic steering device according to claim 2, wherein said flow meter valve means comprises a solenoid valve.

17. The hydraulic steering device according to claim 2, wherein amplification valve means is arranged in said amplification flow path, said amplification valve means in a first operation mode allowing fluid to pass through said amplification flow path and in a second operation mode interrupting said amplification flow path.

18. The hydraulic steering device according to claim 3, wherein amplification valve means is arranged in said amplification flow path, said amplification valve means in a first operation mode allowing fluid to pass through said amplification flow path and in a second operation mode interrupting said amplification flow path.

19. The hydraulic steering device according to claim 5, wherein said amplification valve means is connected to an amplification valve controller said amplification valve controller controlling the operation mode of said amplification valve means.

20. The hydraulic steering device according to claim 7, wherein said flow meter valve controller and/or said amplification valve controller are actuatable by a driver of a vehicle equipped with said steering device.

* * * * *